Dec. 9, 1941.   E. G. GOODELL   2,265,158
METHOD FOR RECOVERING BY-PRODUCTS FROM PULP WASTE LIQUOR
Filed July 3, 1939
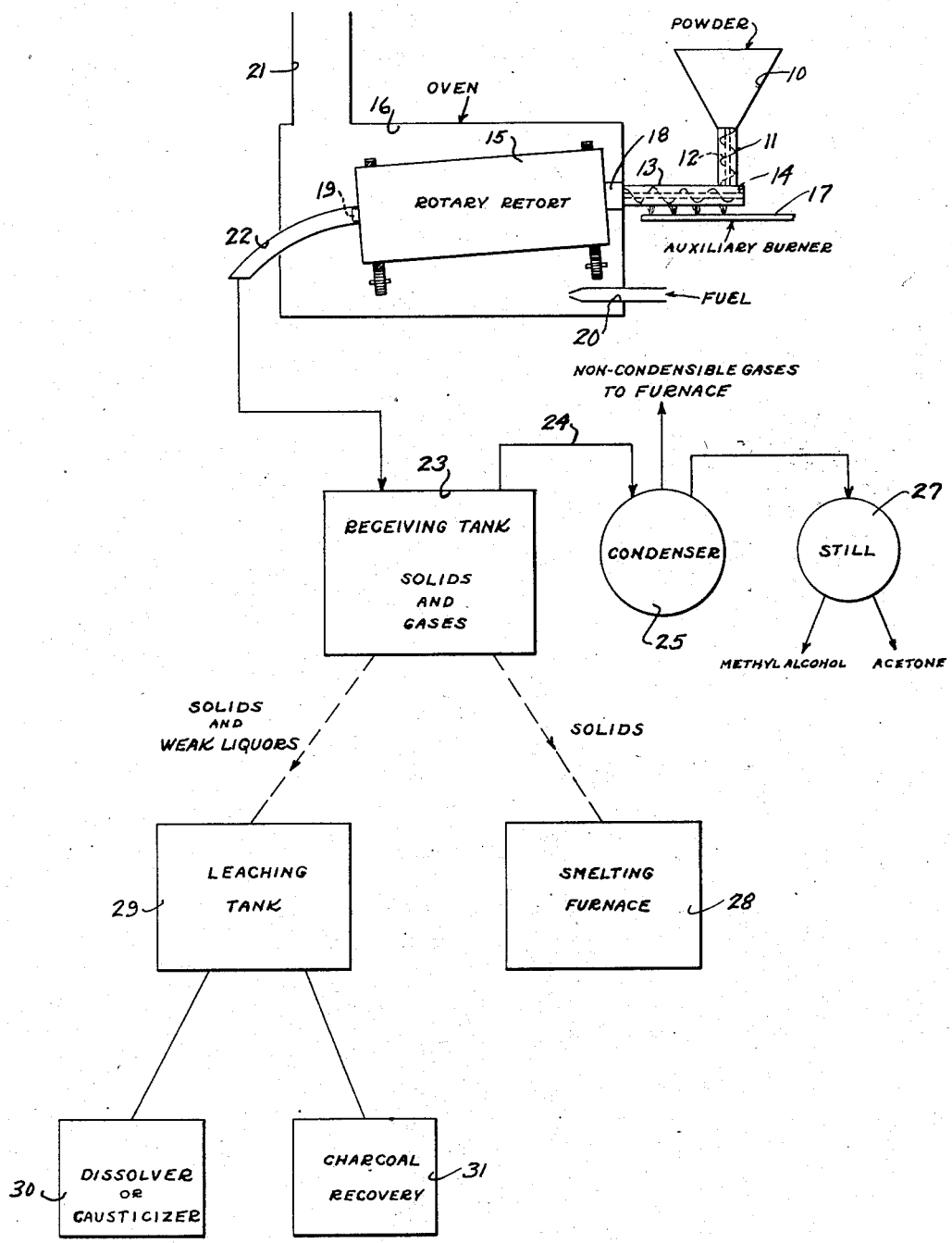

Patented Dec. 9, 1941

2,265,158

UNITED STATES PATENT OFFICE 2,265,158

METHOD FOR RECOVERING BY-PRODUCTS FROM PULP WASTE LIQUOR

Edward G. Goodell, Stevens Point, Wis.

Application July 3, 1939, Serial No. 282,721

3 Claims. (Cl. 202—22)

This invention relates to a method of recovering by-products from waste liquors, such as those produced in the cooking of cellulosic materials.

In the manufacture of chemical pulp, as by the soda, sulphate or sulphite processes, or modifications thereof, waste cooking liquors are produced that contain much of the lignin of the wood or other vegetable material being pulped, as well as spent inorganic chemicals from the original cooking liquors. It has long been known that the lignin and other organic residues contained in such waste liquors will yield valuable by-products, such as methyl alcohol and acetone, upon destructive distillation, but efforts to obtain these by-products in a practical way have heretofore been without success, owing to difficulties encountered in the handling of the waste liquors at high concentrations. The waste liquors are then so extremely viscous and sticky that they cannot be caused to flow readily. Furthermore, if batch distillation is resorted to, the liquors foam so badly as to make such distillation practically impossible.

I have now found, however, that the spray dried powder produced from waste cooking liquors by the process of my Patents Nos. 1,779,535, 1,779,536, 1,779,537 and 1,779,768, all issued on October 28, 1930, or by any other suitable drying method, is peculiarly adaptable to the recovery of by-products without the difficulties heretofore encountered. As the starting material for carrying out the method of my present invention, therefore, I employ a pre-dried material, preferably in the form of spray dried powder, comprising the organic and inorganic solids content of the spent cooking liquor, or other waste liquor having a substantial lignin content. When obtained by the spray drying processes described and claimed in my above enumerated patents, both the organic and inorganic constituents of the spray dried powder are present in a state substantially unchanged chemically from the state in which such constituents exist in the spent cooking liquors. Practically none of the volatile organic constituents are driven off during the spray drying operation. For that reason, the spray dried solids obtained by my patented processes, in addition to being easier to handle, are a richer source of the by-products that this process is designed to recover than would be the so-called "black ash" produced by the usual incinerating processes from waste pulp liquors.

It is therefore an important object of this invention to provide an improved method for the recovery of by-products from waste liquors such as are produced in the chemical processes for the pulping of wood and other vegetable substances.

It is a further important object of this invention to provide an apparatus for use in the recovery of by-products from pre-dried solids containing lignin and to so construct and arrange such apparatus as to simplify the handling of such pre-dried solids.

Other and further important objects of this invention will be apparent from the disclosures in the specification and the accompanying drawing.

This invention (in a preferred form) is illustrated in the drawing and hereinafter more fully described.

On the drawing:

The drawing illustrates schematically a type of apparatus suitable for carrying out my process and includes a flow sheet of the various steps of my process.

The starting material for my process is a pre-dried material, containing a substantial proportion of lignin, resins and their derivatives. Such material can be obtained, as previously stated, by spray drying waste cooking liquors, such as are produced in the cooking of wood and other vegetable materials by the usual chemical processes, such as the sulphate, soda, sulphite or other process employed in the separation of cellulose fibers from the natural wood or vegetable source. While I prefer to start with a spray dried lignin containing material, owing to the ease with which it may be handled and its high content of substantially chemically unchanged organic materials, other methods, such as drum drying, or film drying, may be employed in the preparation of the starting material. Also, while the starting material is here referred to as "pre-dried," it may nevertheless contain an appreciable percentage of water, say upwards of 10 or 15%, so long as it may be handled as a dry solid rather than as a liquid.

The pre-dried starting material, preferably in the form of a loosely powdered or granulated mass, is charged into a hopper 10 having a lower vertically positioned outlet conduit 11 provided with a worm conveyor 12 for advancing the powder into a horizontally disposed conduit 13. Said conduit 13 is likewise preferably provided with a worm conveyor, indicated by the reference numeral 14, for advancing the powder into an inclined rotary retort 15 housed within an oven 16. In order to facilitate the easy flow of powdered material through the horizontal conduit 13, I have found it helpful to apply heat to the walls of said conduit, as by means of an auxiliary burner 17. Upon the application of heat, the powdered material is caused to char and in so doing becomes relatively friable and non-sticky. Heating of the conduit 13 thus avoids packing and clogging of the material in passing therethrough.

The rotary retort 15 is a substantially closed retort, except for the inlet and outlet openings, 18 and 19, respectively, at the ends thereof. The oven 16 is adapted to be heated by means of a burner 20, into which is introduced a fluid fuel, such as oil or gas, the requisite amount of air being introduced in any suitable way to afford complete combustion of the fuel. The heated gaseous combustion products are exhausted from the oven through a stack 21. Solid and gaseous products from the rotary retort 15 are delivered through the outlet 19 into a discharge spout 22, from which they go into a receiving tank 23.

During the passage of the solids through the rotary retort 15, they are subjected to sufficiently high temperatures, in the neighborhood of 500 to 650° F., or even higher, in the substantial absence of air, to effect the destructive distillation of their organic content. As a result of such destructive distillation, various organic compounds of a volatile nature, such as methyl alcohol, acetone, or its derivatives, acetic acid, tar and others, are formed, and the vapors of these volatile organic compounds are discharged through the spout 22 into the receiving tank 23. At the same time, the organic substances that are not decomposed or volatilized, or the residues remaining after destructive distillation, such as charcoal, together with the inorganic solids, are likewise discharged through the spout 22 into the receiving tank 23.

The gases and vapors from the receiving tank 23 are passed through a conduit 24 into a condenser 25, from which the non-condensible gases are led off to a furnace or to the oven 16 to be burned. The condensate from the condenser 25 is passed through a fractionating still 27, in which the various principal organic compounds, such as methyl alcohol, acetone and tar, are separated for separate recovery. As is obvious, instead of employing both a condenser and still, a fractionating condenser may be used and the separate still omitted.

The balance of the process will depend upon the source from which the pre-dried solids were obtained, namely, whether from a sulphate, soda or sulphite cooking liquor. If the predried solids are derived from a sulphate black liquor, then the sodium sulphate content of the carbonaceous residue from the retort 15 must first be reduced to sodium sulphide before the inorganic salts contained in such carbonaceous residue can be regenerated into active cooking liquors. Accordingly, the solids from the receiving tank 23, in the case of sulphate black liquor solids, are conducted from that tank into a smelting furnace 28, where the usual smelting operation is carried out. Since the solids delivered to the smelting furnace are dry, or substantially so, and contain a relatively large proportion of combustible carbonaceous material, the reduction of the sulphate to sulphide may be carried out in the smelting furnace without the use of added fuel, except in the starting up of the smelting operation, and without the addition of further quantities of carbon to effect the desired reducing action. Sodium sulphate, of course, may be added to the smelting furnace in accordance with the usual practice to make up for losses of alkali metal and sulphur in the cooking and recovery system.

Where the pre-dried solids have been derived from the soda process, the solids from the receiving tank 23 are delivered into a leaching tank 29, into which is also introduced a sufficient quantity of weak liquors or water to effect the leaching operation. In the leaching tank 29 the soluble inorganic salts are dissolved out of the carbonaceous residue by the weak liquors to fortify the latter. From the leaching tank, the fortified weak liquors are conducted into a dissolver or causticizing tank 30, where fresh chemicals are added as required to replace losses to prepare the liquor for normal cooking liquor composition.

The carbon remaining in the leaching tank after the soluble inorganic salts have been leached from the carbonaceous mass delivered thereto from the receiving tank, may be drawn off into a charcoal recovery system 31. The carbon so recovered may be utilized in a furnace for its heat values, or may be marketed as such, after washing and removal of excess moisture.

In case the carbon content is removed, as above described, to such an extent as to upset the thermal balance of the recovery system, auxiliary fuel, such as gas, oil, or other combustible material, may be burned under the boilers that furnish the heat necessary for the operation of the recovery system, including that required for furnishing the drying gases in the spray drier.

If the solids are obtained from the conventional sulphite process the carbonaceous residue from the receiving tank 23 can be marketed as such or burned for its heat value.

While it is believed that lignin furnishes the principal source from which are derived methyl alcohol (methanol) and acetone, the operation of my process is not tied up with any particular theory. The important thing is that the solids content of waste liquors from pulping processes, containing upwards of 40 to 60% of the original wood or other vegetable material (on a dry basis), are capable of producing by the method of destructive distillation herein described substantial yields of both methyl alcohol, acetone, tars, etc. Such yields may be in the neighborhood of 7 gallons of 95% methyl alcohol and acetone per cord of wood. These yields represent a considerable saving over the added cost of the by-product recovery system and its operation.

Under some conditions it has been found desirable to introduce a regulated amount of moisture into the rotary retort 15, either in the form of steam or water vapor, to increase the yield of by-products. Catalysts such as sodium hydroxide and other caustic materials can also be introduced to increase the yield. The presence of the carbon formed within the rotary retort has been found to act as a catalyzer toward the reaction leading to the formation of methyl alcohol and acetone. Air or other oxidizing medium is therefore carefully excluded from the interior of the rotary retort so that a maximum amount of carbon may be formed without combustion. With careful exclusion of air, and depending upon the character of the gaseous products and/or carbonaceous residue desired, the temperatures in the rotary retort 15 may be run as high as 1700° F. without giving rise to operating difficulties.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. The method of continuously recovering by-products from granular pre-dried whole spent liquor solids obtained from spent pulp cooking liquors, which comprises forcibly conveying said solids in a loosely powdered condition into a destructive distillation zone, quickly heating said solids during such conveying step to a sufficiently high temperature primarily to char the same and thus render the same relatively friable and non-sticky, destructively distilling said partially charred solids in said destructive distillation zone while said solids are still in a moving stream, and condensing the vapors distilled therefrom.

2. The method of recovering by-products from spray dried solids obtained from the spray drying of spent pulp cooking liquors, which comprises advancing said spray dried solids in a loosely powdered condition, subjecting said solids while being so advanced to a sufficiently high temperature to partially char the same and thus convert the same directly into a relatively friable and non-sticky state, destructively distilling said partially charred solids while the same are kept in motion, and condensing the vapors resulting from such destructive distillation.

3. The method of recovering by-products from spent cooking liquors in the manufacture of chemical cellulose pulp, which comprises spray drying said spent liquors to obtain solids containing the organic and inorganic values of said spent liquors in a substantially unchanged chemical state, advancing said solids in a loosely powdered condition into a destructive distillation zone, destructively distilling said solids in said zone in the substantial absence of air, and condensing the vapors resulting from such destructive distillation.

EDWARD G. GOODELL.